(12) United States Patent
Roth et al.

(10) Patent No.: US 7,951,220 B2
(45) Date of Patent: May 31, 2011

(54) METHOD FOR RECOVERING MOLYBDENIUM, NICKEL, COBALT OR THEIR MIXTURES FROM USED OR REGENERATED CATALYSTS

(75) Inventors: Jean-Luc Roth, Thionville (FR); Ludivine Piezanowski, Villerupt (FR)

(73) Assignee: Paul Wurth S.A., Luxembourg (LU)

( * ) Notice: Subject to any disclaimer, the term of this patent is extended or adjusted under 35 U.S.C. 154(b) by 0 days.

(21) Appl. No.: 12/593,557

(22) PCT Filed: Mar. 25, 2008

(86) PCT No.: PCT/EP2008/053481
§ 371 (c)(1),
(2), (4) Date: Oct. 7, 2009

(87) PCT Pub. No.: WO2008/119695
PCT Pub. Date: Oct. 9, 2008

(65) Prior Publication Data
US 2010/0126309 A1    May 27, 2010

(30) Foreign Application Priority Data
Mar. 30, 2007 (EP) .................................. 07105311

(51) Int. Cl.
*C22B 7/00* (2006.01)
*C22B 9/05* (2006.01)
(52) U.S. Cl. .................. 75/10.39; 75/10.41; 75/10.58
(58) Field of Classification Search ............... 75/10.41, 75/10.39, 10.58
See application file for complete search history.

(56) References Cited

U.S. PATENT DOCUMENTS

| | | | |
|---|---|---|---|
| 4,089,677 A * | 5/1978 | Spenceley et al. | 75/532 |
| 4,699,654 A * | 10/1987 | Maddever et al. | 75/10.45 |
| 5,030,274 A * | 7/1991 | Ward | 75/10.65 |
| 7,169,205 B2 | 1/2007 | Lonardi et al. | 75/10.14 |
| 2009/0229410 A1* | 9/2009 | Bratina et al. | 75/10.17 |
| 2010/0107817 A1* | 5/2010 | Komatani | 75/392 |

FOREIGN PATENT DOCUMENTS

| | | |
|---|---|---|
| DE | 3000040 | 12/1980 |
| DE | 216485 | 12/1984 |
| DE | 238170 | 8/1986 |
| FR | 2494303 | 5/1982 |
| JP | 2001214223 | 8/2001 |
| JP | 2003183745 | 7/2003 |
| JP | 2003183745 A * | 7/2003 |
| JP | 2004035995 | 2/2004 |

OTHER PUBLICATIONS

Machine translation of JP 2003-183745 published Jul. 3, 2003.*
Hochenhofer M. et al: "Einflussparameter auf eine Entschwefelung nach dem Schlackenreaktionsverfahren bei der Herstellung von Ferronickel aus Sekundarrohstoffen" Depotech 2004, Jan. 1, 2004, pp. 729-732, XP009100261.
Hochenhfer M. et al: "Optimierung der Entschwefelung bei der Herstellung von Ferronickel aus Sekundarrohstoffen" Metal, Huethig, Heidelberg, DE, vol. 58, No. 4, Jan. 1, 2004, pp. 196-202, XP009100082; ISSN: 0026-0746.
Pankratz, E: "Aufbereitung von verbrauchten Ni-Fettkatalysatoren" Fat Sci. Technol., vol. 95, No. S1, Jul. 1993, pp. 487-490, XP002480576.
Rakitin D I et al: "Founding of chrome-nickel master alloys from spent nickel alumina containing catalyzer and waste of ferroalloy production" Stal, Metallurgia, Moscow, RU, No. 10, Oct. 1, 1996, pp. 29-31, XP009100192; ISSN: 038-920X.
International Search Report; PCT/EP2008/053481; Jul. 2, 2008.

* cited by examiner

*Primary Examiner* — George Wyszomierski
*Assistant Examiner* — Tima M McGuthry-Banks
(74) *Attorney, Agent, or Firm* — Cantor Colburn LLP

(57) ABSTRACT

The invention describes a method for recovering molybdenum, nickel, cobalt or their mixtures from used or regenerated catalysts in an electric arc furnace containing a heel of liquid cast iron, surmounted with a fluid slag, comprising the following steps: a) adding used or regenerated catalysts into the heel contained in the electric arc furnace, b) adding dosed lime in order to obtain a slag with a CaO to $Al_2O_3$ ratio comprised between 0.7 and 1.3, c) mixing the heel by injecting gas so as to avoid formation of crusts, d) melting the used or regenerated catalysts in the electric arc furnace in order to obtain a liquid ferro-alloy.

13 Claims, No Drawings

METHOD FOR RECOVERING MOLYBDENUM, NICKEL, COBALT OR THEIR MIXTURES FROM USED OR REGENERATED CATALYSTS

TECHNICAL FIELD OF THE INVENTION

The present invention relates to a method for recovering valuable metals from used or regenerated catalysts.

BRIEF DESCRIPTION OF RELATED ART

Used or regenerated catalysts generally are in the form of granules based on porous alumina with a metal coating of molybdenum and sometimes also of nickel and/or cobalt, such as those used in the petrochemical industry. Other used or regenerated catalysts considered are those known as Raney nickel catalysts.

In used catalysts, the metals essentially are in the form of sulphides with sulphur and carbon contents ranging up to 20% by mass each.

For regenerated catalysts having undergone a treatment for removing sulphur and carbonates by calcination, the metals essentially are in the form of oxide. The sulphur and carbon content is then less than 3%, sometimes even less than 1%.

A typical analysis of used and regenerated catalysts is shown below:

|  | Used catalysts | Regenerated catalysts |
| --- | --- | --- |
| Active elements | | |
| Mo |  | 5-15% |
| Ni |  | 0-5% |
| Co |  | 0-4% |
| Support/coating | | |
| Total C | 0.5-20% | 0.5-3% |
| S | 0.5-12% | 0.5-3% |
| P | 0-2.5% | 0-2.5% |
| $FeO_x$ | 1.5-3% | 0-3% |
| $Al_2O_3$ |  | 20-85% |
| $SiO_2$ |  | 0-20% |

Conventionally, molybdenum and sometimes also nickel and/or cobalt from used or regenerated catalysts are separated and purified through a succession of hydrometallurgical steps. The main drawbacks of these long processes are:
- the cost of the treatment which becomes very high if the initial residue is poor in nickel and/or in molybdenum
- the residues obtained in these hydro-retreatment processes generate alumina-based byproducts which are not inert notably toward leaching reactions. This therefore entails additional costs for particular storage or retreatment.

BRIEF SUMMARY OF THE INVENTION

The invention provides an alternative method for recovering molybdenum, nickel, cobalt or their mixtures from used or regenerated catalysts.

DETAILED DESCRIPTION OF THE INVENTION

According to the invention, this goal is achieved by a method for recovering molybdenum, nickel, cobalt or their mixtures from used or regenerated catalysts in an electric arc furnace comprising several electrodes, equipped with a sole and containing a heel of liquid molten cast iron, surmounted with non-foaming liquid slag. The method comprises the following steps:
a) transfer of used or regenerated catalysts, containing at least one metal selected from molybdenum, nickel, cobalt or their mixtures, into the heel contained in the electric arc furnace,
b) addition of dosed lime so as to obtain and maintain a slag with a $CaO$-to-$Al_2O_3$ ratio comprised between 0.7 and 1.3,
c) mixing the heel by injecting gas so as to avoid crust formation,
d) melting the used or regenerated catalysts in the electric arc furnace in order to obtain a liquid ferro-alloy.

The proposed method applies the electric free arc furnace in a very particular mode, consisting of loading waste particles containing alumina and/or copper and working on a cast iron heel surmounted with a fluid slag layer.

By energetically mixing the heel, it is possible to homogenize the temperature of the heel and of the slag; to permanently renew the slag layer in contact with the heel so that it remains overheated and highly liquid, and capable of absorbing used or regenerated catalysts without the latter solidifying and then forming an impassable crust. Indeed, upon impact of the catalysts on the slag, the latter are directly digested by the furnace medium and melt very rapidly because of the dynamic mixing.

This mixing of the heel may be carried out by injecting a neutral gas (nitrogen, argon) through the sole of the electric arc furnace at gas flow rates preferably comprised between 10 l/min·t (liters per minute and per metric ton of liquid metal of the bath) and 150 l/min·t. More preferably, the mixing gas flow rate is located between 15 and 50 l/min·t. Of course, these flow rates have to be adjusted depending on the height of the heel as well as on the number and the position of the injection points. These high mixing gas flow rates are unrelated with current practice at the electric arc furnace. Indeed, the mixing gas flow rate in conventional processes for producing steel in an electric arc furnace is located in the range from 0.1 to 5 l/min·t and is exclusively intended for homogenizing the heel and regularizing metallurgical results and the temperature.

In order to guarantee optimum efficiency of the mixing, the metal heel should have a certain minimum height, preferably a height of at least 0.3 m. One should make sure to avoid that the injection of the mixing gas through the sole of the furnace simply makes a "hole" through the metal bath, without dynamically setting it into motion. Of course, this minimum height may vary depending on the configuration of the electric arc furnace and on the location of the gas injection means which preferably are porous bricks or nozzles.

Transfer of the catalyst and of the lime into the electric furnace is preferably accomplished between the electrodes. Alternatively, loading of the catalyst and of lime is accomplished from an orifice in the vault of the arc furnace. This orifice provided with a runner, is now located on the perimeter of the circle of the electrodes, with a tilt of the runner so that the material, when it falls, penetrates between the electrodes in the heel.

Transfer of the catalyst and of lime into the electric furnace is preferably accomplished simultaneously or alternately.

At the beginning of the operation, there is no or only very little slag on the heel, a fluid slag is gradually formed as catalyst and lime are introduced therein.

The slag formed during the process essentially consists of an alumina mixture, possibly with silica and lime. The $CaO/Al_2O_3$ ratio is constantly adjusted so as to maintain a ratio comprised between 0.7 and 1.3, preferably between 0.8 and 1.2, more preferably between 0.9 and 1.1 and in particular close to 1. The main advantage of this slag is that it is fluid. Indeed, fluidity of the slag may be compared with that of a mineral oil. Preferably the slag is non-foaming.

According to another preferred embodiment, additional agents for forming slag are further added during step a) or step b). These agents for forming slag are preferably selected from the group consisting of castine (fluxstone) and magnesia as well as their mixtures.

Another advantage of this slag is that it is a good desulfurizing agent at temperatures above 1,500° C. Consequently, sulphur contents less than or equal to 0.1% may be achieved in the final ferro-alloy and even so in the case of strongly sulphide-contaminated catalysts (up to about 12% S). As the amount of formed slag is significant as regards the composition of the raw material and of the introduced amount of lime in order to maintain the $Al_2O_3/CaO$ ratio within the desired interval, the cast iron has to be deslagged by removing the slag (as a whole or partly) from the electric furnace at regular intervals. This has the advantage of renewing the slag at regular intervals and of more easily extracting the sulphur provided by the addition of catalysts with strong sulphur content.

An additional advantage of the present method resides in the fact that even catalysts may be recovered, which have relatively high phosphorus content (up to 2.5% P). Phosphorus like sulphur is considered as a pollutant among the products capable of reusing the resulting ferro-alloy as a raw material. High phosphorus contents are particularly a nuisance in making chromium steels. Indeed, an interesting outlet for the alloy obtained by the present method is the production of stainless steel with the proviso of having a low phosphorus and sulphur content.

Indeed, after melting the raw material and obtaining a cast iron comprising for example up to 25% of molybdenum and a maximum of 0.1% of sulphur, the phosphorus content may be reduced. This dephosphorization is accomplished by adding oxidizing elements in the liquid metal, for example by injecting oxygen into the liquid metal or else by adding iron oxides preferably as an ore. The phosphorus content in the liquid metal after this dephosphorization is much less than 0.1%.

The thereby obtained ferro-alloy comprises from 10 to 25% molybdenum, between 0 and 10% Ni, between 0 and 8% Co as well as very low phosphorus and sulphur contents. Further, the phosphorus and sulphur contents are easily adaptable to the constraints imposed by potential uses of the ferro-alloy.

The obtained ferro-alloy is then cast.

This ferro-alloy with low sulphur and phosphorus content therefore opens a new outlet for catalysts which have become unusable.

With this method for recovering used or regenerated catalysts, a ferro-alloy may be made, containing iron, molybdenum with possibly nickel or cobalt, with low sulphur and phosphorus content in only two steps and in a single reactor (electric furnace). Moreover, with this recovery method, it is possible to resort to a combination of standard pieces of equipment (an electric furnace, a loading device, a bath mixing device) which are used under specific operating conditions.

Other particularities and features of the invention will become apparent from the detailed description of an advantageous embodiment presented below, as an illustration.

Example 1

The making of an iron-molybdenum-nickel alloy or of the iron-molybdenum-cobalt alloy with low sulphur and phosphorus content is accomplished in an electric free arc furnace comprising several electrodes. The making of the iron-molybdenum-nickel or iron-molybdenum-cobalt alloy is described in the same way (due to the similar behaviour of nickel and cobalt).

The operation starts on a cast iron heel (carburized iron) at 1,550° C. In a first phase, it consists of continuously loading the catalyst with simultaneous or alternate addition of dosed lime so as to obtain a slag with a $CaO/Al_2O_3$ ratio of the order of 1.

The catalysts treated in Example 1 are regenerated petrochemical catalysts based on porous alumina with molybdenum and nickel coating.

The table below indicates the chemical composition of the catalyst used:

|  | Composition |
| --- | --- |
| Fe | 2.4% |
| Mo | 10.2% |
| Co | 0.2% |
| Ni | 2.8% |
| $Al_2O_3$ | 43.6% |
| $SiOl_2$ | 8.1% |
| S | 1.2% |
| P | 1.1% |

Melting tests take place in an electric 3 MVA free arc furnace. The rated capacity of the furnace is 6 metric tons. The product flow rate (catalyst+lime) at the entrance of the furnace is about 2 t/h.

The heel is formed from 4 t of molten cast iron. The temperature of the bath is maintained between 1,550 and 1,650° C. The average product flow rate at the entrance of the furnace (catalyst+lime) is of the order of 2 t/h with peaks at 3 t/h. The bath is mixed by nitrogen gas at a flow rate from 15 to 20 l/min·t.

The amount of initial slag is negligible. The slag is gradually formed as the product penetrates into the bath. The melting of the catalyst is very fast and the latter is rapidly digested by the system. A negligible amount of non-melted product above the slag was able to be observed during the test when the loading flow rate was too high. Injections of carbon are selectively carried out into the cast iron bath so as to maintain a carbon content of the order of 2 to 4% in the bath.

The desulfurization phase takes place simultaneously with the melting in the electric furnace. Indeed, the actual composition of the slag (alumina-lime) provides it with desulfurizing power and consequently the sulphur content may be reduced to at least up to 0.1%.

The dephosphorization phase takes place at the end of the continuous melting phase of the catalyst when the targeted molybdenum content is reached, and the sulphur content is acceptable. If sulphur is too high, an additional desulfurization phase is carried out by a $CaO—Al_2O_3$ slag, followed by deslagging (slag loaded with sulphur). Exhaustion of the phosphorus is accomplished by injecting oxygen into the bath and by adding lime.

The table below indicates the composition of the ferro-alloy and of the slag after introducing about 5.3 metric tons of catalyst on 4 t of liquid cast iron:

| Mass | Heel (cast iron) 4.0 t | Ferro-alloy 4.6 t | Slag 6.6 t | Dusts 45 kg |
|---|---|---|---|---|
| Fe | 96% | 80.9% | 4.1% | 39.5% |
| C | 3.2% | 3.7% | 0.00% | 0.0% |
| Mo | <0.005% | 11.2% | 0.60% | 1.4% |
| Ni | 0.02% | 3.1% | <0.05% | 0.3% |
| $Al_2O_3$ | 0% | 0.0% | 35.3% | 0.5% |
| $SiO_2$ | 0% | 0.0% | 7.2% | 4.2% |
| S | 0.01% | 0.1% | 0.9% | 2.9% |
| P | 0.08% | 0.01% | 0.4% | 0.2% |
| CaO | 0% | 0.0% | 49.5% | 4.4% |

The goal of this test is to show that the present invention allows the making of a marketable alloy within a relatively short time, with 10 to 25% molybdenum content and sulphur and phosphorus content less than 0.1%. The test shows that the goal of making an iron-molybdenum nickel ferro-alloy with low sulphur and phosphorus contents is achieved in an electric free arc furnace from catalyst (alumina-molybdenum-nickel). Further, this test shows that a molybdenum and nickel yield of the order of 95% may be achieved.

The invention claimed is:

1. A method for recovering molybdenum, nickel, cobalt or their mixtures from used or regenerated catalysts in an electric arc furnace comprising several electrodes, equipped with a sole and containing a liquid cast iron heel, surmounted with a fluid slag, comprising the following steps:
    a) adding used or regenerated catalysts containing at least one metal selected from the group consisting of molybdenum, nickel and cobalt, as well as their mixtures, into the heel contained in the electric arc furnace,
    b) adding dosed lime so as to obtain a slag with a CaO to $Al_2O_3$ ratio comprised between 0.7 and 1.3,
    c) mixing the heel by injecting gas so as to avoid formation of crusts,
    d) melting the used or regenerated catalysts in the electric arc furnace in order to obtain a liquid ferro-alloy.

2. The method according to claim 1, wherein the addition of used or regenerated catalysts and/or of lime is carried out by gravity.

3. The method according to claim 1, wherein the addition of used or regenerated catalysts and/or lime is carried out in a region located between the electrodes of the electric arc furnace.

4. The method according to claim 1, wherein agents for forming slag selected from the group consisting of castine and magnesia as well as their mixtures are added during step a) or step b).

5. The method according to claim 1, wherein the mixing of the heel is achieved by injecting a neutral gas through the sole of the electric arc furnace at a flow rate comprised between 10 l/min·t and 150 l/min·t and preferably at a flow rate between 10 and 50 l/min·t.

6. The method according to claim 1, further comprising:
    e) deslagging the obtained alloy by removing the slag,
    f) adding oxidizing elements in order to reduce the phosphorus content to below 0.1%,
    g) casting the thereby obtained ferro-alloy.

7. The method according to claim 6, wherein the adding of oxidizing elements during step f) is carried out by injecting a gas containing oxygen and/or by adding iron oxides.

8. The method according to claim 6, wherein the slag is entirely or partly removed, several times before casting the alloy.

9. The method according to claim 6, wherein the C content of the heel is adjusted to values comprised between 2 and 4% (w/w).

10. The method according to claim 5, characterized by the following additional steps:
    e) deslagging the obtained alloy by removing the slag,
    f) adding oxidizing elements in order to reduce the phosphorus content to below 0.1%,
    g) casting the thereby obtained ferro-alloy.

11. The method according to claim 10, wherein the adding of oxidizing elements during step f) is carried out by injecting a gas containing oxygen and/or by adding iron oxides.

12. The method according to claim 10, wherein the slag is entirely or partly removed, several times before casting the alloy.

13. The method according to claim 10, wherein the C content of the heel is adjusted to values comprised between 2 and 4% (w/w).

* * * * *